(12) United States Patent
Brown, Jr.

(10) Patent No.: US 12,458,078 B2
(45) Date of Patent: Nov. 4, 2025

(54) HARNESS SYSTEM FOR DISPLACED INDIVIDUALS

(71) Applicant: TELECARE LLC, West Milford, NJ (US)

(72) Inventor: Jacob T. Brown, Jr., Dover, NH (US)

(*) Notice: Subject to any disclaimer, the term of this patent is extended or adjusted under 35 U.S.C. 154(b) by 65 days.

(21) Appl. No.: 18/609,058

(22) Filed: Mar. 19, 2024

(65) Prior Publication Data

US 2024/0324702 A1   Oct. 3, 2024

Related U.S. Application Data

(60) Provisional application No. 63/492,799, filed on Mar. 29, 2023.

(51) Int. Cl.
*A41D 1/00*   (2018.01)
*A41D 1/04*   (2006.01)

(52) U.S. Cl.
CPC .............. *A41D 1/002* (2013.01); *A41D 1/04* (2013.01)

(58) Field of Classification Search
None
See application file for complete search history.

(56) References Cited

U.S. PATENT DOCUMENTS

| | | |
|---|---|---|
| 7,343,880 B2 | 3/2008 | Bergkvist |
| 8,960,511 B2 | 2/2015 | Shepherd et al. |
| 9,084,470 B1 | 7/2015 | Huck |
| 11,819,324 B2 * | 11/2023 | Cusey ................. A61B 5/6802 |
| 2005/0045687 A1 | 3/2005 | Willows et al. |
| 2012/0174299 A1 * | 7/2012 | Balzano ................. A41D 1/005 2/463 |
| 2014/0135593 A1 * | 5/2014 | Jayalth ............... G09B 19/0038 600/301 |
| 2015/0312839 A1 * | 10/2015 | Trehan ................. H04W 76/14 370/338 |
| 2017/0035354 A1 * | 2/2017 | Jayalath ............... A61B 5/0022 |
| 2017/0079336 A1 * | 3/2017 | Hirschberg ............ A41D 1/002 |
| 2018/0182259 A1 * | 6/2018 | O'Dowd ................... A41F 9/00 |
| 2019/0037934 A1 | 2/2019 | Swank et al. |
| 2021/0005072 A1 | 1/2021 | Dinkins |
| 2021/0153780 A1 * | 5/2021 | Jayalath ................ G16H 40/67 |

(Continued)

FOREIGN PATENT DOCUMENTS

WO   WO-2017164727 A1 *   9/2017   ........... A45F 5/1516

*Primary Examiner* — Steven M Marsh
(74) *Attorney, Agent, or Firm* — McNees Wallace & Nurick LLC

(57) ABSTRACT

A harness system adapted to communicate a distress signal. A vest device includes a pocket defined thereon. The pocket can contain a mobile device. The vest device further includes a transceiver and a signal-boosting antenna for transmitting a signal, the transceiver and the signal-boosting antenna integrated into the fabric of the vest device in one embodiment. The transceiver is programmed with a transmitter code. The transceiver is programmed to automatically activate, then, upon receipt of the transmitter code, deactivate. The transceiver is in electronic communication with a disaster register and a telemedicine website. Further, the transceiver is in electronic communication with an emergency dispatch station; wherein, upon activation, the signal serves as a distress call from the registrant including global positioning and vitals for the registrant.

19 Claims, 3 Drawing Sheets

(56) References Cited

U.S. PATENT DOCUMENTS

2022/0054850 A1* 2/2022 Umberger ................ G06N 3/02
2022/0295972 A1   9/2022 Salentine et al.
2022/0329680 A1* 10/2022 Scheffer .................. H01Q 1/38
2023/0381527 A1* 11/2023 Moore .................. A61N 1/3904
2025/0201401 A1* 6/2025 Webster ................ G16H 40/40

* cited by examiner

HARNESS SYSTEM FOR DISPLACED INDIVIDUALS

CROSS-REFERENCE TO RELATED APPLICATIONS

The present application claims benefit of U.S. Provisional Application Ser. No. 63/492,799, filed Mar. 29, 2023, the disclosure of which is incorporated herein by reference.

FIELD OF THE INVENTION

The present invention relates to wearable, vest-type harnesses. In particular, comprehended is harness designed for use by police, other first responders, and the public for everyday use and adornment while involved in daily activities who may have been voluntarily and involuntarily displaced as a result of a disaster.

DESCRIPTION OF THE RELATED ART

Traditional, chest-worn vests or harnesses are not specifically designed for technology devices. Further, they have to be produced in multiple sizes and do not easily adjust and attenuate for being easily applied to common apparel (i.e, bulky overcoats, jackets, and other outer garments). Typical harnesses do not further account for (a) multiple user body sizes and shapes; (b) different and common clothing worn by the user; (c) accommodation of different shapes, sizes of multiple and different models of smartphone devices; (d) ease of adornment (putting on and taking off), and (e) security for loss and breakage of the device under circumstances of a strong, aggressive, and intentional effort (versus accidental dislodging) to separate the device from the device and/or user; (f) having the harness itself transmit a signal to a monitoring source (i.e, GDR) (independent of the device) serves as a resource for security to track and locate the user; (g) to deter against kidnapping, unlawful detention, being lost, disoriented to location; and (h) disorientation by children, the elderly, mentally disabled and victims of disasters.

More importantly, climate change has greatly increased the incidence of major disasters (i.e., earthquakes, hurricanes, floods, fires, etc.). These events often led to an increase in the number of persons being lost, displaced, or their status (informed, dead, or alive) otherwise undetermined. Displacement also occurs due to man-made intentional and unintentional acts (i.e., war, abductions, plane crashes, being lost, etc.). Recently, involuntary detentions and separations associated with immigrant migrations have contributed to the incidence of missing and displaced persons. Scent-sniffing dogs and first responders help in some incidences when the person is buried under debris. However, the person's identity, location, and status are significantly delayed and/or cannot be determined by traditional search and rescue procedures.

U.S. Pat. No. 7,210,605 to Willows et al. shows an improved harness for purposes of making the user more visible. U.S. 2019/0037934 to Swank et al. discloses a safety vest with enhanced visibility and which includes integrated technologies such as a power port, GPS vest location device, an accelerometer and an alert system. U.S. 2021/0005072 to Dinkins shows a wearable device with data transmission and communication mechanisms embedded therein.

Everyone is a potential victim of natural, man-made disasters, abductions, detentions, and other events resulting in being trapped, lost, or involuntarily displaced. The GDR register and technology can help to be prepared for the worst-case scenario of unexpected consequences of disasters and displacement.

Needed then is a harness-type apparel/device which communicates with these registrars, specially designed for use by police, other first responders, and the public for everyday use and adornment while involved in daily activities who may have been voluntarily and involuntarily displaced as a result of a disaster.

SUMMARY OF THE INVENTION

Termed herein, in part, the Global Disaster Register (GDR), described is a technology apparel and harness combination specially designed to facilitate the location, identity, rescue, and medical care for displaced persons and victims of the disaster. In accordance with the aforementioned, the GDR technology, along with other devices, is integrated into the apparel device holder.

Therefore, it is an objective of the present invention to provide a technology apparel/harness which endures the traumas of disaster.

It is further an objective to provide a technology apparel/harness in various forms of complexity to differentiate uses by the general public and by first responders. In one embodiment, a common apparel/harness is designed to be used by the general public. In an advanced embodiment, the advanced harness is designed for use by police and other first responders. In either instance, the harnesses are designed to easily and quickly adorn any body type and clothing, uniform, situation, or seasonal attire (bulletproof vest, overcoats, etc.). The adaptability of the harness is made possible by the design and type of materials selected and their placement on specific parts of the harness.

In an exemplified embodiment, the instant harness and position of the device (placed high on the user's shoulder) are specially designed for use by police, first responders, and the public in a variety of situations. The harness's device pocket(s) is designed to allow the device to perform one-way recording while remaining in the pocket. The device camera can be placed in any position in the vehicle (via an extension cord) without being separated from the user.

A device security extension cord (SEC) is designed to maximize variations and positions of use and to minimize the chance of damage resulting from the device being dropped or lost. Lastly, in the proposed version of the harnesses, the transceiver and antenna (embedded in the harness fabric) transmit a signal that enables the user to be tracked, located, and identified. Other features as disclosed are shown and described.

Accordingly, comprehended is a harness system, comprising: a vest device; a pocket defined on the vest device for containing a mobile device; a transceiver and a signal-boosting antenna for transmitting a signal, the transceiver and the signal-boosting antenna integrated into the fabric of the vest device; the transceiver programmed with a transmitter code; the transceiver programmed to automatically activate, then, upon receipt of the transmitter code, deactivate; the transceiver in electronic communication with a disaster register; the transceiver in electronic communication with a telemedicine website; the transceiver in electronic communication with an emergency dispatch station; wherein, upon activation, the signal serves as a distress call from the registrant including global positioning and vitals for the registrant.

DETAILED DESCRIPTION OF THE INVENTION

Figure 1:
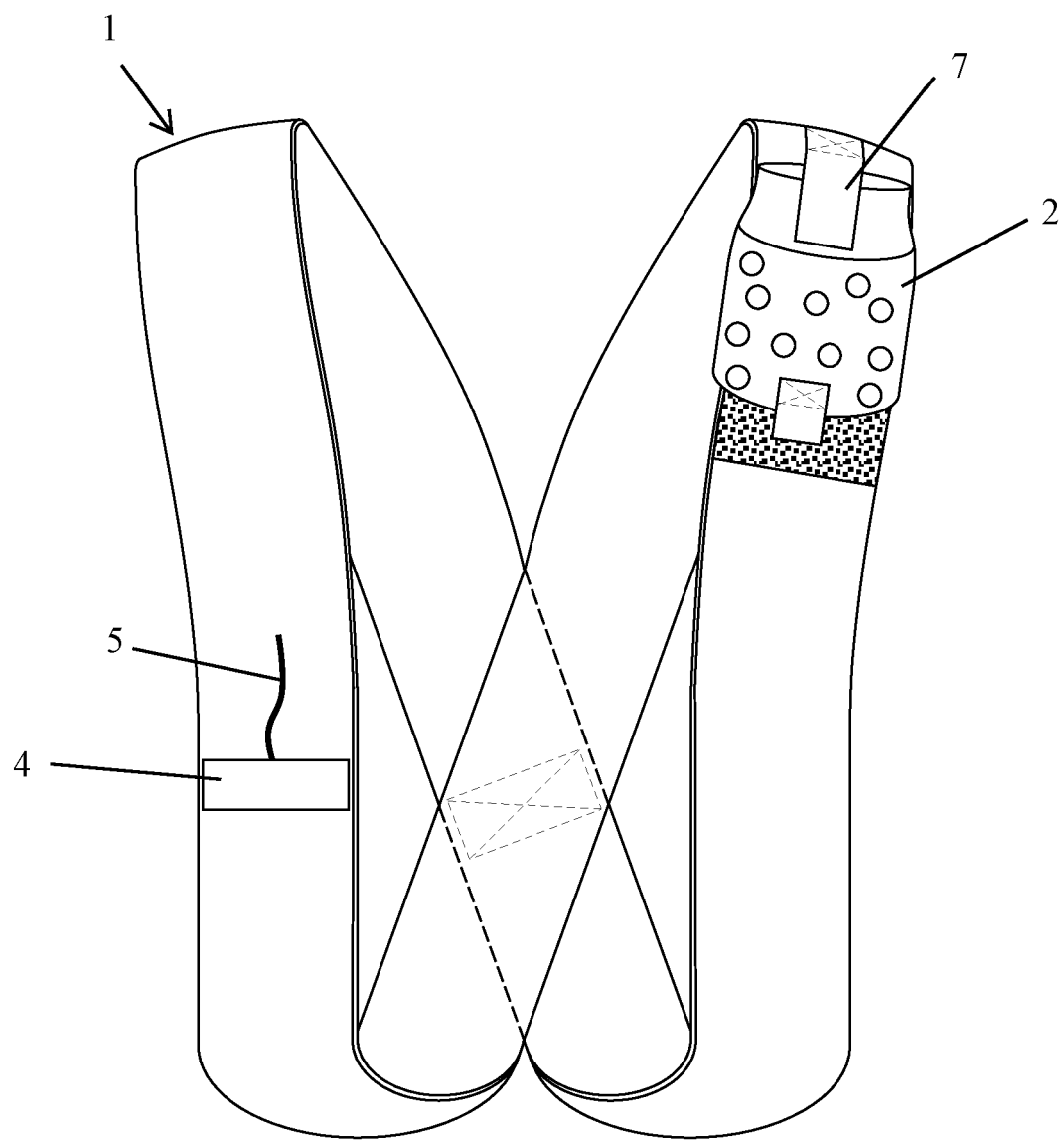
FIGS. 1-2 depict the vest device of the harness system.
Figure 2:
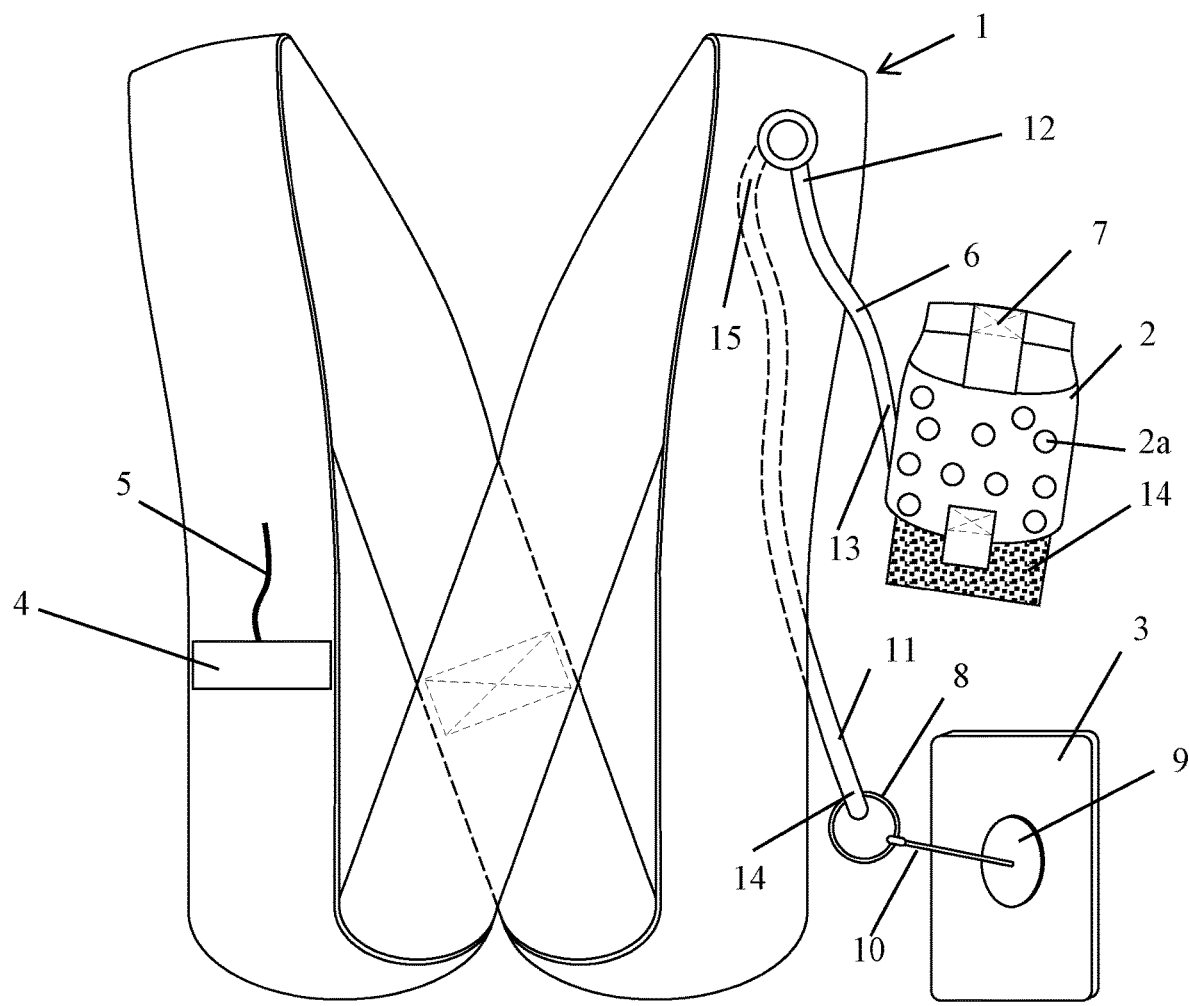
Figure 3:
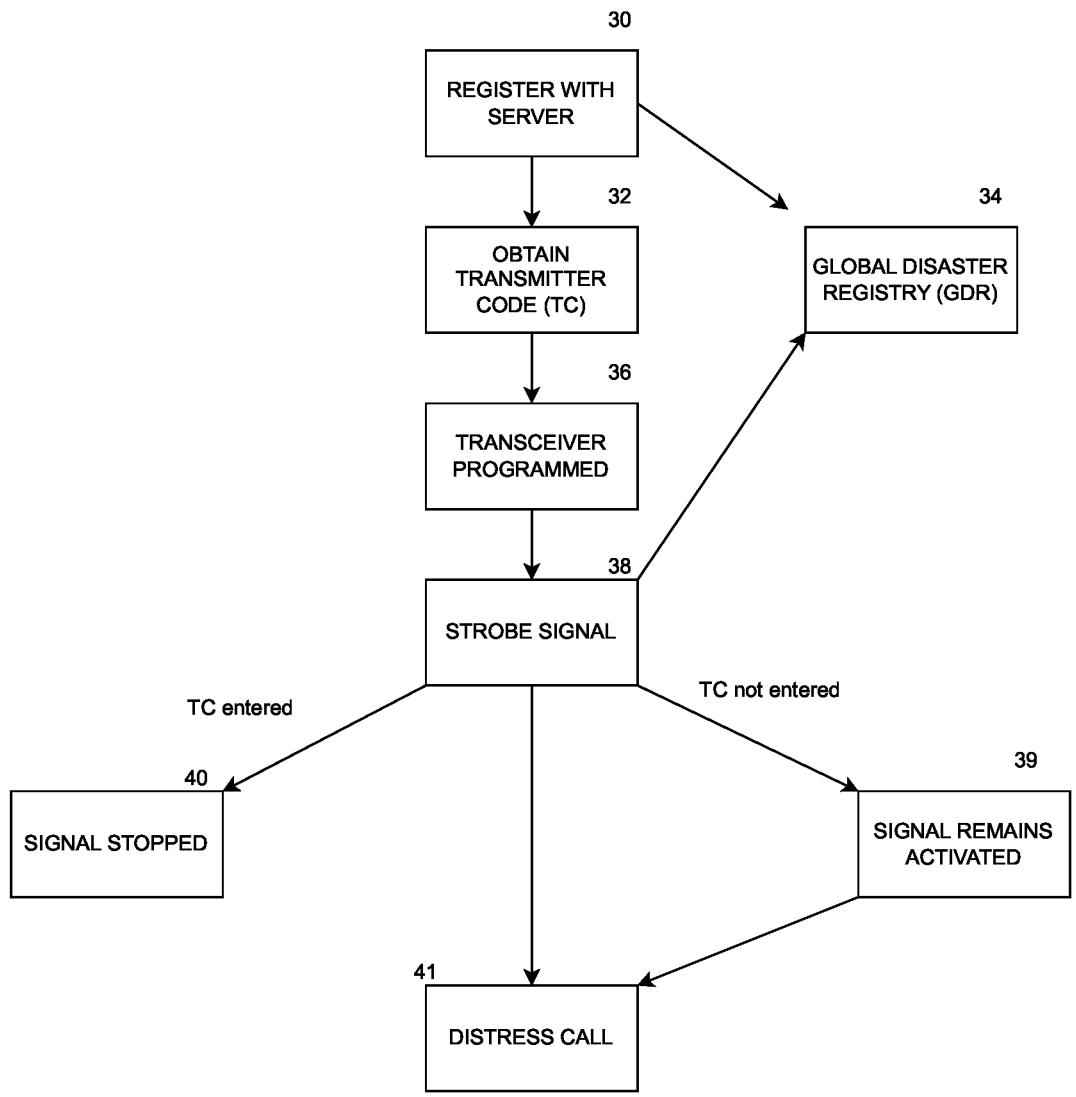
FIG. 3 is a flow chart depicting the signal flow of the harness system.

Referencing now FIGS. 1-3, the invention comprehends apparel/harness and associated technology. The harness itself, termed herein "vest device" 1 is part of a harness system, the "harness system" also including the technology. The vest device 1 component of the harness system is depicted in FIGS. 1-2 and is a strapped, wearable, preferably sleeveless garment that shows at least one pocket 2. Pockets 2 or sleeves are adapted to contain a mobile device 3. "Mobile device" 3 herein means cameras, portable chargers, handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices 3 can electronically communicate wirelessly (for example, using radio frequency (RF) signals) to various communication networks (described below), thus, herein "electronic communication". The mobile devices 3 can include sensors for determining characteristics of the mobile device's current environment. It should be understood the design and location of each pocket 2 can vary, and even be provided on the back of the vest device 1. However, the vest device 1 is designed for use by police, other first responders, and the public and can easily be adorned using a waist belt over any uniform, attachments, casual or seasonal attire, hence the location of the pocket on the front is preferred.

The one or more pockets 2 are designed on or can be adapted to the vest device 1 using elastic and sized to be adapted to contain the mobile device 3. Thus, the pocket 2 is defined on the vest device 1 for containing a mobile device 3. A cord 6 can be attached to the back of the pocket 2 to render the pocket 2 removable while concurrently not entirely disassociating from the vest device 1. The cord 6 could be elastic, semi-rigid, fabric, or drawstring, not limited thereto. Thus, in some embodiments, first end 12 of cord 6 is attached to vest device 1, and the second end 13 is attached to the pocket 2. The pocket 2 can further contain a hook-and-loop fastener 14 for further attachment to the vest device 1 directly.

A security strap 7 and optional buckle are included on the pocket 2 to secure the mobile device 3 in position within the pocket 2 and reduce the probability of it being rendered useless as a result of the mobile device 3 being dropped, dislodged, or damaged. The phone pocket 2 is perforated with a plurality of defined perforations 2a, as shown, enhancing the reception of voice control to the device and other signal reception and transmission.

A security extension, i.e. extension 11, allows a user to remove the mobile device 3 from the pocket 2 and manually manipulate the mobile device 3 with added security and reduced risk of damage from drop or loss when apart from pocket 2. The extension 11 could be elastic, semi-rigid, fabric, or drawstring, not limited thereto. The proximal end 15 of extension 11 is attached to vest device 1. The extension 11 can include a tether 10 and thus be tethered to the vest device 1 at the distal end 14. In one embodiment the mobile device 3 is contained within the pocket 3 while concurrently tethered to the extension 11 and thus the vest device 1. This is enabled by providing a ring 8 attached to the extension 11 as shown at the distal end 14. The tether 10 is attached to the ring 8 and therefore is adapted to travel through the pocket 2, e.g., through the perforation 2a of the pocket 2. The device ring 8 is attached to a plastic circular disc 9 using tether 10. Disc 9 has an adhesive backing. The plastic adhesive disc 9 is therefore pressed against and secured to the back of the mobile device 3, for example. The practical significance of the user being able to remove the mobile device 3 via the extension 11 can be appreciated with the option for first responders to conduct a video conference where users can see, hear and talk to each other (two-way recording).

As part of the harness system, a transceiver 4 and a signal-boosting antenna 5 both are integrated into the fabric of the harness. The transceiver 5 can include a signal-boosting antenna 5, in combination, which transmits a signal. The transceiver 5 is in electronic communication with one or more websites. Accordingly, embodiments herein are also implemented using computing devices interconnected by any form or medium of wireline or wireless digital data communication (or combination thereof), for example, a communication network. Examples of interconnected devices are a client and a server generally remote from each other that typically interact through a communication network. A client, for example, the mobile device 3, can carry out transactions itself, with or through a server. The server here is the telemedicine website for example. In the preferred embodiment herein, the client is a mobile device which carries out the process, which can be done at any remote location. Thus, the instant system and methodology is further implemented as above with associated computerized hardware. A controller system is the computer or the client mobile device collecting data from a data collection system, storing the data in a memory system, and generating displays, confirmations or reports. The controller system, data collection system, memory system, and confirmation system may all be embodied as an app running on one or more general purpose portable computing devices, such as a smartphone, tablet computer, or laptop computer or may take the form of a distributed computing system implemented by a number of separate devices, at least a portion of which is accessible over the internet (e.g., cloud-based computing and via application programming interfaces (API) and electronic data interchange (EDI) data formats). It should be known a computer program is an executable program of instructions which can be executed on one computer or on multiple computers that are located at one site or distributed across multiple sites and interconnected by a communication network. Generally, a computer will also include, or be operatively coupled to receive data from or transfer data to, or both, one or more mass storage devices for storing data.

A computer can be embedded in another device, for example, a mobile device 3, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry. Additionally, processors for execution of a computer program include, by way of example, both general and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Any reference to "module" means a subsystem or component of the software or methodology which can be integrated or independent and which performs the set of defined functions or tasks.

Accordingly, and with particular reference to FIG. 3, both common and advanced harnesses, as follows, are integrated with or can also be designed with a special compartment that will house the transceiver 4 and signal-boosting antenna 5. First, a registrant or user of the harness system will be encouraged to register with the server 30, i.e. the telemedicine website, to obtain a transmitter code (TC) 32. The TC will be automatically or manually programmed into a transceiver (ESP32) 36. The transceiver 4 will preferably be securely sealed into the fabric of the vest device to prevent unauthorized removal and false identification of the user. The transceiver 4 will be programmed to transmit audio and/or visual strobe signal on a pre-determined schedule (i.e., every two hours) 38. The user will verbally or manually enter their special code (TC) to stop the transmission 40. If the user does not enter their TC, the signal will continue and be interpreted as a distress call 39, 41. The distress signal will be received by emergency and/or first responder dispatch stations.

The transceiver 4 signal will also be received by the Global Disaster Register (GDR) so that it can indicate that the user's location and identity have been determined 34. The GDR is a module or subsite of the telemedicine website/server receiving a user's registration. If the transceiver is stolen, broken, damaged, or stopped without the user's TC being entered, the last location of transmission and identity of the user will automatically be transmitted to the GDR servers and website. More particularly, the GDR is connected to a telemedicine website that will retain the user's vital health record and information 34. In addition to locating and identifying users, the GDR website module will offer Virtual emergency access to medical care and treatment. Said another way, in one embodiment, the GDR module is in communication with a telemedicine module. The GDR can provide Application Programming Interfaces (APIs) that allows the platform to integrate with any site, including the telemedicine site.

The above describes use in disasters, and the vest device can also be used for everyday activities of life (i.e., work, shopping, walking the dog, driving, etc.). The recent escalation of hate crimes, and violence, especially against women in public, on college campuses, on planes, subways, and other forms of mass transit suggest additional purposes, use, and market opportunities. In fact, the harness system can be worn and combined with a backpack and thus would provide additional protection and security, for children, first responders, hunters, and campers. Evidence, tracking, and location and identification of the user would be enhanced.

There are two (2) basic types of apparel/harnesses, e.g., (a) Common and (b) Advanced. The Common harness is designed to be used by the general public. The Advanced harness is designed for use by police and other first responders. The harnesses are designed to easily and quickly adorn any type of clothing, uniform, or seasonal attire (Bullet Proof Vest, Overcoats, etc.). The adaptability of the harness is made possible by the type of materials and the design of pockets/holders for the devices selected and their placement on specific parts of the harness.

The Common harness is comprised of elastic material which allows for a flexible fit to accommodate almost any size person and clothing that the person may be wearing. The device pocket that holds the device will be made of elastic material to accommodate the same. There will be a variety of attachable and detachable device pocket holders designed to accommodate different size devices and camera, speaker, and microphone positions on the devices. The security extension cord (SEC) will be attached to the back inside of the pocket and the other end of the device. For the Advanced Harness, elastic extension is part of the waistband of the harness.

What is claimed is:

1. A harness system, comprising:
   a vest device;
   a pocket defined on said vest device for containing a mobile device;
   a transceiver and a signal-boosting antenna for transmitting a signal, said transceiver and said signal-boosting antenna integrated into said fabric of said vest device;
   said transceiver programmed with a transmitter code;
   said transceiver programmed to automatically activate, then, upon receipt of said transmitter code, deactivate;
   said transceiver in electronic communication with a disaster register;
   said transceiver in electronic communication with a telemedicine website;
   said transceiver in electronic communication with an emergency dispatch station;
   wherein, upon activation, said signal serves as a distress call from a user including global positioning and vitals for said user.

2. The harness system of claim 1, further comprising an extension, said extension having a first end and a second end, said first end of said extension attached to said vest device, said second end attached to said pocket.

3. The harness system of claim 1, further comprising a cord, said cord having a proximal end and a distal end, said proximal end attached to said vest device.

4. The harness system of claim 3, further comprising a ring attached at said distal end.

5. The harness system of claim 4, further comprising a tether attached to said ring.

6. The harness system of claim 5, further comprising a disc adhered to said mobile device, wherein said tether is attached to said disc, thereby said mobile device with said tether can be removably stored within said pocket without disassociating from said vest device.

7. The harness system of claim 1, wherein said signal is an audio signal.

8. The harness system of claim 1, wherein said signal is a visual signal.

9. The harness system of claim 1, wherein said pocket includes a plurality of perforations defined therethrough.

10. The harness system of claim 1, further comprising a strap attached to said pocket.

11. The harness system of claim 1, wherein the telemedicine website and the disaster register communicate with each other.

12. A harness system, comprising:
    a vest device;
    a pocket defined on said vest device for containing a mobile device;
    a cord, said cord having a proximal end and a distal end, said proximal end attached to said vest device;
    a ring attached at said distal end;
    a tether attached to said ring; and, a disc adhered to said mobile device, wherein said tether is attached to said disc, thereby said mobile device with said tether can be removably stored within said pocket without disassociating from said vest device.

13. The harness system of claim 12, further comprising an extension, said extension having a first end and a second end, said first end of said extension attached to said vest device, said second end attached to said pocket.

14. The harness system of claim 12, further comprising a transceiver and a signal-boosting antenna for transmitting a signal, said transceiver and said signal-boosting antenna integrated into said the fabric of said vest device;
  said transceiver programmed with a transmitter code;
  said transceiver programmed to automatically activate, then, upon receipt of said transmitter code, deactivate;
  said transceiver in electronic communication with a disaster register;
  said transceiver in electronic communication with a telemedicine website;
  said transceiver in electronic communication with an emergency dispatch station;
  wherein, upon activation, said signal serves as a distress call from a user including global positioning and vitals for said user.

15. The harness system of claim 14, wherein said signal is an audio signal.

16. The harness system of claim 14, wherein said signal is a visual signal.

17. The harness system of claim 12, wherein said pocket includes a plurality of perforations defined therethrough.

18. The harness system of claim 12, further comprising a strap attached to said pocket.

19. The harness system of claim 14, wherein the telemedicine website and the disaster register communicate with each other.

\* \* \* \* \*